Patented Oct. 19, 1948

2,451,672

UNITED STATES PATENT OFFICE 2,451,672

ALCOHOL INSOLUBLE NITROGEN SUBSTITUTED POLYAMIDES

Hugh W. Gray, Wilmington, Del., assignor to E. I. du Pont de Nemours & Company, Wilmington, Del., a corporation of Delaware No Drawing. Application December 8, 1944, Serial No. 567,316

12 Claims. (Cl. 260—78)

The invention relates to polymeric materials and more particularly to polyamides.

Alcohol-soluble polyamides have been obtained by reacting a synthetic linear polycarboxylic-amide of the kind described in United States Patents 2,071,250, 2,071,253 and 2,130,948 with alcohol and formaldehyde in the presence of formic and/or other oxygen-containing acid catalysts. These modified polyamides, referred to generally as N-alkoxymethyl polyamides, by reason of their solubility in alcohols lend themselves to ready fabrication into fibers or films, which are of especial value because of their excellent pliability and elasticity. The usefulness of the products fabricated from these polymers is limited, however, by water sensitivity, low softening temperatures and by inherent solubility in common solvents.

The previous methods, including baking and incorporation of acidic catalysts, proposed to overcome the mentioned disadvantages in properties are subject to several difficulties. For example, insolubilization by heat treatment alone may result in excessive degradation by reason of the high temperatures and long times required. Acid-catalyzed insolubilization is complicated by undesirable side reactions, especially loss of N-amide substituent groups with resultant decrease in elasticity and pliability. In addition, the acid-catalyzed insolubilization treatment requires careful control of such variables as time and temperature to avoid an excessive degree of insolubilization and/or loss of substituent groups. For this reason it is essential in most applications to subsequently remove the acid catalyst by washing or neutralization to prevent continued reaction with resultant loss of elasticity and extensibility. In thick molded objects, the acid cannot be readily removed and the acid curing technique is thereby limited to thin films.

This invention has as an object a new and improved method for converting the initially alcohol and soluble polyamides of the type above described into insolubilized polymers having a substantially undiminished degree of amide substitution. A further object is the production of improved insolubilized polyamides of this kind which melt substantially higher than the polymer in its soluble form. Other objects will appear hereinafter.

The above objects are accomplished by methods wherein agents which function as insolubilization catalysts or as curing agents, which are more particularly described below, are incorporated with an N-alkenoxymethyl polyamide, and the resulting composition or product subjected to a heating or photolytic treatment which activates the curing agent.

Materials which are of especial utility as the insolubilization catalysts or curing agents for obtaining the present insolubilized polymers are compounds in the class described by the literature as free radical-producing agents, the most valuable of which for the present purpose are the organic peroxy compounds. Other compounds of this class, referred to in more detail later are also useful, and of these agents those particularly suitable are ketones, such as benzoin and biacetyl, which readily supply free radicals by photolytic decomposition with ultraviolet light.

I have discovered that when the modified or alcohol soluble polyamide is one obtained by using an unsaturated alcohol in the previously mentioned reaction of the initial polyamide with alcohol, formaldehyde, and oxygen-containing acid catalyst, that the incorporation into the resulting polymer of agents of the above mentioned kind, followed by baking or photolytic activation depending on the particular agent, yields insolubilized polymers which melt at least 5° C. higher than the polymer in its alcohol soluble state, and in which the degree of amide substitution is substantially unchanged.

In the best method of practicing the invention the curing agent is an organic peroxide and the heating or baking period is at least two minutes up to 10 minutes or more at a temperature of at least 20° C. and below that of decomposition of the polymer, temperature which will vary somewhat depending on the particular peroxide and time. The temperatures most desirably used are 20° C. to 200° C.

When the parent N-alkenoxymethyl polyamide is sufficiently alcohol-soluble it is expedient to make a suitable solution in alcohol, add the curing agent, and convert the solution to a formed structure such as a filament, film, or coating by conventional methods, followed by heat treatment to effect the insolubilization. Incorporation of the curing agent by milling or impregnation is also satisfactory. Alternative treatments involve exposure of the N-alkenoxymethyl polyamide to ultraviolet light, or utilization of conventional rubber vulcanization agents and technique.

It should be noted that when the same N-alkenoxymethyl polyamide not containing the organic peroxide or other free radical-producing agent, or when an N-alkoxymethyl polyamide obtained by reaction of the initial polyamide with a saturated alcohol, e. g., propyl alcohol is used, heat treatment under the same conditions given above in connection with the N-alkenoxymethyl polyamide containing peroxide is ineffective from the standpoint of producing the insolubilized polymers of this invention. It is also noteworthy that N-alkenoxymethyl polyamides containing peroxide are not detrimentally affected by continued heating after the insoluble stage has been reached. This situation contrasts sharply with that of acid-catalyzed crosslinking.

When the curing agent is an organic peroxide or similar free-radical-producing agent, the insolubilization apparently proceeds through formation of intermolecular crosslinks involving a free radical-initiated addition of the N-amide substituent unsaturated alkyl groups.

The invention is further illustrated by the following examples in which the parts are by weight.

Example I

A mixture of three parts of N-allyloxymethyl polyhexamethylene adipamide having about 44% of the amide groups bearing N-allyloxymethyl substituents and 7 parts of methanol was stirred at 60° C. to give a clear, viscous solution. Benzoyl peroxide (0.06 part) was added and the resulting solution was flowed on a glass plate and air-dried to a tough, transparent film, which was soluble in hot alcohol, softened at 130° C., and melted in boiling water. The film was then baked for 5 minutes at 105° C., after which it was insoluble in hot alcohol, did not melt at 300° C., and was resistant to boiling water. Baking for an additional 25 minutes at 105° C., caused no significant loss in strength or elasticity of the film. Analysis indicated that the original degree of amide substitution was substantially unchanged. The following table summarizes pertinent physical data on these films.

| Baking Time Min. | Solubility in Hot Alcohol | Resistance to Boiling Water | Softening Temp., °C. | Tensile Strength lb./sq. in. 50% | | Elastic Recovery from 400–500% Elongation, Per Cent |
|---|---|---|---|---|---|---|
| | | | | R. H. | Wet | |
| 0 | Soluble | Melted | ca. 130 | 1,670 | 350 | 88 |
| 5 | Insoluble | Satisfactory | over 300 | 2,400 | 830 | 88 |
| 30 | do | do | over 300 | 2,360 | 650 | 89 |

The N-allyloxymethyl polyamide in the foregoing example was prepared from polyhexamethylene adipamide having an intrinsic viscosity in cresol of about 1.0 by the following procedure: A mixture of 1 part of the polyamide, 1 part formaldehyde, 2.5 parts allyl alcohol was heated to 140° C. in an autoclave and 0.03 part of phosphoric acid was injected into the mixture. After 8 minutes the mixture was discharged into 2 parts of 80% aqueous methanol solution containing sufficient ammonia to neutralize the acid. The material was filtered and the substituted polyamide precipitated by the addition of water. The alkenoxymethyl polyamides in the following examples were obtained by a similar method.

Example II

A mixture of one part of N-allyloxymethyl polyhexamethylene adipamide (about 40–45% of the amide groups bearing N-allyloxymethyl substituents) and two parts of methanol was stirred at 60° C. to give a clear, viscous solution. Benzoyl peroxide (0.01 part) was added and the solution was flowed on a glass plate and air dried to a clear film. This film, which was still soluble in alcohol, was baked at 105° C. for 15 minutes and was then insoluble in hot alcohol.

A similar film, containing no benzoyl peroxide, but otherwise prepared in identical fashion, remained soluble in alcohol even after baking as long as 45 minutes at 105° C.

Example III

A mixture of one part of N-allyloxymethyl polyhexamethylene adipamide (about 50% amide substitution) and 2 parts of methanol was stirred at 60° C. to give a clear, viscous solution. Benzoin (0.01 part) was added and the solution was flowed on a glass plate. The resulting clear air-dried film was exposed to ultraviolet radiation for 7 hours and was then insoluble in hot aqueous methanol. It did not melt at 300° C. and was resistant to boiling water.

In another embodiment the curing agents are those known to be useful in the vulcanization of rubber and particularly sulfur and compounds of the kind mentioned in the following two examples and which are used in accordance with known rubber vulcanization technique.

Example IV

Twenty parts of a reinforcing channel black ("Micronex") was mixed with 20 parts of N-methallyloxymethyl polyhexamethylene adipamide on a rubber mill at 100–120° C. Mercaptobenzothiazole (0.2 part), zinc oxide (1.0 part), stearic acid (0.4 part) and sulfur (0.4 part) were then milled in and the resulting sheet was heated in a mold for one hour at 140–150° C. The vulcanized sheet was not changed by boiling water or hot 80% aqueous ethanol, while a similar unvulcanized sample was disintegrated by 80% aqueous ethanol at room temperature.

Example V

A mixture of one part of the N-allyloxymethyl polyhexamethylene adipamide used in Example III and two parts of methanol was stirred at 60° C. To this solution was added 0.05 part of tetraethylthiuram disulfide. The solution was flowed on a glass plate and the resulting clear air-dried film was baked for 3 hours at 100–140° C. The film was then insoluble in hot alcohol, was unaffected by boiling water, and did not melt at 300° C.

Example VI

An N-alkenoxymethyl polyamide was prepared by the action of formaldehyde, methanol and allyl alcohol on polyhexamethylene adipamide in the presence of phosphoric acid at 140° C. The resulting mixed N-allyloxymethyl-methoxymethyl polyhexamethylene adipamide was found to have about 50% of all the amide groups substituted and the ratio of methoxymethyl to allyloxymethyl substitution was about 4 to 1.

This N-alkenoxymethyl polyamide was then compounded on the mill with ingredients in the following proportions added in the order given.

| | Parts |
|---|---|
| Polyamide | 100 |
| Palm oil (lubricant) | About 1 |
| Monobenzylether of hydroquinone (anti-oxidant) | 0.5 |
| BaSO₄ (filler) | 100 |
| Black iron oxide (pigment) | 5.0 |
| Dispersion of 23% benzoyl peroxide on CaSO₄ | 17.6 |

The smooth sheet obtained from the mill when molded at 120° C. for 5 minutes was insoluble in hot alcohols while the sample prior to molding was readily soluble. The molded, cured sheet was highly flexible, rubbery and was resistant to boiling water and hot hydrocarbon solvents.

The alkenoxymethyl polyamides used in the practice of this invention are obtained in the manner described in application Serial No. 559,252, filed October 18, 1944, by T. L. Cairns, now Patent No. 2,441,057. In one method of making these polymers, a solution of the initial polyamide in formic acid is heated, preferably at 25° to 75° C., with paraformaldehyde and an ethylenically or acetylenically unsaturated alcohol or the corresponding thiol. The product can be isolated by adding water or other nonsolvent to the reaction mixture. In another method the solid polyamide is treated with the unsaturated alcohol (e. g., allyl alcohol), and with formaldehyde and a small amount of phosphoric or other oxygen-containing catlyst, and the reaction mixture heated form 100° C. to 150° C. The oxygen-containing acid catalysts are acids having an ionization constant of at least as great as $9.6 \times 10^{-6}$ and an equivalent conductance, measured at 25° C. in 0.01 N concentration, no greater than 370 ohms⁻¹.cm².

The above reaction converts a portion of the carbonamide groups

in the initial polyamide to the groups

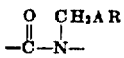

In the alkenoxymethyl polyamides, A is oxygen or sulfur and R is any unsaturated alkyl radical. The products of greatest utility are those in which the R group is obtainable from readily available unsaturated alcohols, e. g., allyl, methallyl, crotyl, furfuryl, cyclohexenyl, cinnamyl, oleyl, sorbyl, propargyl, ricinoleyl alcohols, etc., or the corresponding thiols. The degree of substitution can be varied widely by changing the reaction conditions and is in particular dependent on the amount of formaldehyde and water present. The process of this invention can be applied to N-alkoxymethyl polyamides in which any appreciable portion, namely, from 1% to 100% of the amide substitution comprises N-alkenoxymethyl groups. Polyamides in which 5 to 60% of the amide groups are so substituted with N-alkenoxymethyl groups are of greatest utility because of their high degree of pliability, elasticity and extensibility.

The initial polyamides from which the N-alkenoxymethyl polyamides are obtained are of the general type described in the previously mentioned patents. The polyamides of this kind, generally speaking, comprise the reaction product of linear polymer-forming compositions containing amide-forming groups, obtained for example, by reacting material consisting essentially of bifunctional molecules each containing two reactive groups which are complementary to reactive groups in other molecules and which includes complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have an intrinsic viscosity of at least 0.4 and a unit length of at least 7, where "unit length" is defined as in United States Patents 2,071,253 and 2,130,948. The average number of carbon atoms separating the amide groups in these polyamides is at least two.

These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. The simple linear polyamides contain the recurring amide groups

in which X is oxygen or sulfur and a substantial portion of the R is hydrogen, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid.

The most useful of the N-alkenoxymethyl polyamides used in the practice of this invention are those derived from such commercially available polyamides as polyhexamethylene adipamide, polyhexamethylene sebacamide, or their interpolymers with epsilon caprolactam which are of sufficiently high molecular weight to facilitate fiber or film formation. In general, the preferred polyamides used in preparing the present N-alkenoxymethyl polyamides are the polycarbonamides which include the polyureas, e. g., polydecamethylene urea. Other examples of useful polyamides are described in U. S. 2,071,253 and 2,130,948. However, polysulfonamides (U. S. 2,321,890 and 2,321,891), e. g., the polysulfonamide derived from decamethylene-diamine and m-benzenedisulfonyl chloride, can also be used. Additional polymers which can be used are the polyurethanes and polythiourethanes (U. S. 2,284,637), e. g., the polymer derived from decamethylene diisocyanate and decamethylene glycol; polythionamides (U. S. 2,201,172), e. g., polydecamethylene thiourea; polyhydrazides, e. g., that derived from hydrazine and sebacic acid; and polyesteramides, e. g., that derived from ethanolamine and sebacic acid.

The free radical-producing agents are in general any of the compounds described in the literature (Hey and Waters, Chem. Rev. 21, 169 (1937)) and commonly accepted as thermally or photolytically decomposable to free radical fragments at reasonably low temperatures, e. g., below 200° C. The most valuable of these compounds for the present purpose, as has been previously indicated are the peroxides, particularly the diacyl peroxides, such as benzoyl peroxide, lauroyl peroxide, diacetyl peroxide, dipropionyl peroxide and benzoyl acetyl peroxide. Other useful agents are the dialkyl peroxides (e. g. diethyl peroxide), hydrogen peroxide, zinc peroxide, ascaridole and the sodium, potassium or ammonium persulfates, percarbonates or perborates. Organometallic compounds which undergo thermal dissociation to free radicals at conveniently low temperatures are represented by phenyl lithium, butyl lithium, ethyl mercuric bromide and phenyl magnesium bromide, particularly in the presence of such materials as cobaltous chloride. Various organic nitrogen compounds are applicable, for example azo compounds (e. g., azomethane, diazomethane) which decompose photolytically or thermally to free radical fragments. Aryl diazonium halides or diazotates behave similarly. Photolytic decomposition of alkyl halides, aldehydes or ketones may also supply free radicals which effect the insolubilization reaction. Acyloins, such as benzoin and alpha, beta-diketones, such as biacetyl, are particularly effective agents in combination with ultraviolet light. Metallic compounds, e. g. cobalt naphthenate, peculiar to the drying oil industry, are applicable. Prolonged exposure to atmospheric oxygen may also effect insolubilization.

The insolubilization catalysts can be used in any proportions containing the agent in appreciable amount. Amounts of the agent from 0.1 to 20% based on the weight of the polymer are usually sufficient, depending on the type of polymer and the properties desired in the final product.

When it is desired to incorporate the curing agent by milling, it is usually desirable first to mill into the N-alkenoxymethyl polymide an antioxidant. Suitable antioxidants for this purpose are the phenols, both mono and polyhydric ethers of these phenols and substituted aromatic amines, for example, tert-butylcatechol, hydroxybiphenyl, monobenzylether of hydroquinone, N-phenyl-α-naphthylamine, etc.

Although 2-10 minutes at 100-150° C. has been found preferable as the time and temperature for insolubilizing the N-alkenoxymethyl polyamides, the time and temperature may be varied within wide limits. The optimum time and temperatures depend upon the amount of curing agent (e. g., peroxide) present as well as the relative amount of N-alkenoxymethyl (e. g., N-alloxymethyl) groups in the substituted polyamide. It is also to be understood that the time and temperature are interdependent and very short periods of time are required for curing when high temperatures (e. g., as obtained by radiant heating) are employed.

The insolubilized products of this invention have substantially the same amount of N-alkoxymethyl groups as before insolubilization but the insolubilized products have little, if any, ethylenic unsaturation present.

The insolubilized alkenoxymethyl polyamides of this invention are advantageously used in such structures as yarns, fibers, films, molded objects, adhesive compositions, coatings and interliners for fabrics, and interliners for safety glass, plywood laminations, and the like.

As many apparently widely different embodiments of this invention may be made without departing from the spirit and scope thereof, it is to be understood that I do not limit myself to the specific embodiments thereof except as defined in the appended claims.

I claim:
1. A process for rendering N-alkenoxymethyl polymides insoluble in alcohol and increasing their melting point, said process comprising incorporating with an alcohol-soluble N-alkenoxymethyl polycarbonamide, in which from 1% to 100% of the amide substitution consists of N-alkenoxymethyl groups, a free radical-producing agent in amount of from 0.1% to 20% by weight of said N-alkenoxymethyl polycarbonamide, said agent being selected from the group consisting of peroxy compounds, ketones, organo-metallic compounds, and azo compounds, and then activating said agent at a temperature of from 20° C. to 200° C. to decompose said agent into free radicals, and continuing the reaction until said polycarbonamide is essentially insoluble in alcohol in which the initial untreated polyamide is soluble, the amide groups in said polycarbonamide being an integral part of the polymer chain, and the average number of carbons in the segments of the chain separating the amide groups being at least two.

2. The process set forth in claim 1 wherein said N-alkenoxymethyl polycarbonamide is N-allyloxymethyl polycarbonamide.

3. The process set forth in claim 1 wherein said N-alkenoxymethyl polycarbonamide is N-allyloxymethyl polycarbonamide in which from 5 to 60% of the amide groups have the allyloxmethyl group attached to the nitrogen atom.

4. The process set forth in claim 1 wherein said N-alkenoxymethyl polycarbonamide is N-methallyloxymethyl polycarbonamide.

5. The process set forth in claim 1 wherein said N-alkenoxymethyl polycarbonamide is N-methallyloxymethyl polycarbonamide, in which from 5 to 60% of the amide groups have a methallyloxymethyl group attached to the nitrogen atom.

6. The process set forth in claim 1 wherein said N-alkenoxymethyl polycarbonamide is N-allyloxymethyl polyhexamethylene adipamide.

7. The process set forth in claim 1 wherein said N-alkenoxymethyl polycarbonamide is N-methallyloxymethyl polyhexamethylene adipamide.

8. A modified alcohol-insoluble N-alkenoxymethyl polycarbonamide in which from 5% to 60% of the amide groups have an alkenoxymethyl group attached to the nitrogen atom, and which as compared to the unmodified N-alkenoxymethyl polycarbonamide in its initially prepared alcohol-soluble state, melts at least 5° C. higher, said modified alcohol-insoluble polyamide being that obtained by the process set forth in claim 1.

9. A modified alcohol-insoluble N-alkenoxymethyl polycarbonamide which consists of N-allyloxymethyl polycarbonamide, and in which from 5% to 60% of the amide groups have the allyloxymethyl group attached to the nitrogen atom, and which as compared to the unmodified N-allyloxymethyl polycarbonamide in its initially prepared state, melts at least 5° C. higher and contains the degree of the allyloxymethyl substitution on the nitrogen substantially unchanged, said modified alcohol-insoluble N-alkenoxymethyl polycarbonamide being that obtained by the process set forth in claim 1.

10. A modified alcohol-insoluble N-alkenoxymethyl polycarbonamide which consists of N-methallyloxymethyl polycarbonamide, and in which from 5% to 60% of the amide groups have the methallyloxymethyl group attached to the nitrogen atom, and which as compared to the unmodified N-methallyloxymethyl polycarbonamide in its initially prepared state, melts at least 5° C. higher and contains the degree of the methallyloxymethyl substitution on the nitrogen substantially unchanged, said modified alcohol-insoluble N-alkenoxymethyl polycarbonamide being that obtained by the process set forth in claim 1.

11. A process for rendering N-alkenoxymethyl polyamides insoluble in alcohol and increasing their melting point, said process comprising incorporating with an alcohol-soluble N-alkenoxymethyl polycarbonamide, in which from 1% to 100% of the amide substitution consists of N-alkenoxymethyl groups, a peroxy compound in amount of from 0.1% to 20% by weight of said N-alkenoxymethyl polycarbonamide, and then activating said compound at a temperature of from 20° C. to 200° C. to decompose it into free radicals, and continuing the reaction until said polycarbonamide is essentially insoluble in alcohol in which the initial untreated polyamide is soluble, the amide groups in said polycarbonamide being an integral part of the polymer chain, and the average number of carbons in the segments of the chain separating the amide groups being at least two.

12. A process for rendering N-alkenoxymethyl polyamides insoluble in alcohol and increasing their melting point, said process comprising incorporating with an alcohol-soluble N-alkenoxymethyl polycarbonamide, in which from 1% to 100% of the amide substitution consists of N-alkenoxymethyl groups, a peroxy compound in amount of from 0.1% to 20% by weight of said N-alkenoxymethyl polycarbonamide, and then heating said polycarbonamide and peroxy compound incorporated therein at a temperature of from 100° C. to 200° C. and continuing the reaction until said polycarbonamide is essentially insoluble in alcohol in which the initial untreated polyamide is soluble, the amide groups in said polycarbonamide being an integral part of the polymer chain, and the average number of carbons in the segments of the chain separating the amide groups being at least two.

HUGH W. GRAY.

No references cited.

Certificate of Correction

Patent No. 2,451,672.   October 19, 1948.

HUGH W. GRAY

It is hereby certified that errors appear in the printed specification of the above numbered patent requiring correction as follows:

Column 1, line 43, before the word "soluble" strike out "and"; column 5, line 35, for "form" read *from*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.* the methallyloxymethyl group attached to the nitrogen atom, and which as compared to the unmodified N-methallyloxymethyl polycarbonamide in its initially prepared state, melts at least 5° C. higher and contains the degree of the methallyloxymethyl substitution on the nitrogen substantially unchanged, said modified alcohol-insoluble N-alkenoxymethyl polycarbonamide being that obtained by the process set forth in claim 1.

11. A process for rendering N-alkenoxymethyl polyamides insoluble in alcohol and increasing their melting point, said process comprising incorporating with an alcohol-soluble N-alkenoxymethyl polycarbonamide, in which from 1% to 100% of the amide substitution consists of N-alkenoxymethyl groups, a peroxy compound in amount of from 0.1% to 20% by weight of said N-alkenoxymethyl polycarbonamide, and then activating said compound at a temperature of from 20° C. to 200° C. to decompose it into free radicals, and continuing the reaction until said polycarbonamide is essentially insoluble in alcohol in which the initial untreated polyamide is soluble, the amide groups in said polycarbonamide being an integral part of the polymer chain, and the average number of carbons in the segments of the chain separating the amide groups being at least two.

12. A process for rendering N-alkenoxymethyl polyamides insoluble in alcohol and increasing their melting point, said process comprising incorporating with an alcohol-soluble N-alkenoxymethyl polycarbonamide, in which from 1% to 100% of the amide substitution consists of N-alkenoxymethyl groups, a peroxy compound in amount of from 0.1% to 20% by weight of said N-alkenoxymethyl polycarbonamide, and then heating said polycarbonamide and peroxy compound incorporated therein at a temperature of from 100° C. to 200° C. and continuing the reaction until said polycarbonamide is essentially insoluble in alcohol in which the initial untreated polyamide is soluble, the amide groups in said polycarbonamide being an integral part of the polymer chain, and the average number of carbons in the segments of the chain separating the amide groups being at least two.

HUGH W. GRAY.

No references cited.

Certificate of Correction

Patent No. 2,451,672.            October 19, 1948.

HUGH W. GRAY

It is hereby certified that errors appear in the printed specification of the above numbered patent requiring correction as follows:

Column 1, line 43, before the word "soluble" strike out "and"; column 5, line 35, for "form" read *from*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*